United States Patent
Smith, II et al.

(10) Patent No.: US 10,284,722 B2
(45) Date of Patent: *May 7, 2019

(54) CONTACT MANAGEMENT SYSTEM

(71) Applicant: Dealer WRX, LLC, Pasadena, TX (US)

(72) Inventors: William Carroll Smith, II, Pasadena, TX (US); Matthew Brandon Smith, Pasadena, TX (US); William Carroll Smith, III, Pasadena, TX (US)

(73) Assignee: Dealer WRX, LLC, Pasadena, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,091

(22) Filed: Mar. 26, 2018

(65) Prior Publication Data

US 2018/0213085 A1     Jul. 26, 2018

Related U.S. Application Data

(63) Continuation of application No. 15/057,998, filed on Mar. 1, 2016, now Pat. No. 9,930,177.

(51) Int. Cl.
| | |
|---|---|
| *H04M 3/00* | (2006.01) |
| *H04M 5/00* | (2006.01) |
| *H04M 3/51* | (2006.01) |
| *G06Q 10/10* | (2012.01) |
| *G06Q 10/06* | (2012.01) |
| *H04M 3/42* | (2006.01) |
| *H04M 3/523* | (2006.01) |
| *G06Q 30/00* | (2012.01) |

(52) U.S. Cl.
CPC .... *H04M 3/5158* (2013.01); *G06Q 10/06398* (2013.01); *G06Q 10/1095* (2013.01); *G06Q 30/012* (2013.01); *G06Q 30/016* (2013.01); *H04M 3/4211* (2013.01); *H04M 3/5175* (2013.01); *H04M 3/5191* (2013.01); *H04M 3/5233* (2013.01)

(58) Field of Classification Search
CPC ........ H04M 3/5158; H04M 2203/552; H04M 2203/558; H04M 3/5233; H04M 3/5232; H04M 3/2218
USPC .... 379/266.08, 266.07, 265.06, 265.05, 242, 379/265.01, 265.11, 265.12, 266.1
See application file for complete search history.

(56) References Cited

U.S. PATENT DOCUMENTS

| | | | |
|---|---|---|---|
| 8,649,500 B1 * | 2/2014 | Cohen ................. | H04M 3/5158 379/265.01 |
| 9,258,423 B1 * | 2/2016 | Beall ................... | H04M 3/5158 |

* cited by examiner

*Primary Examiner* — Thjuan K Addy
(74) *Attorney, Agent, or Firm* — Foley & Lardner, LLP

(57) ABSTRACT

A system for contact management a server to store, for a campaign, a list of contacts and a contact plan associated with that list of contacts, for each contact, agent notes, and, for the campaign, agent assistance text. The server determines a highest priority opportunity from the list of contacts for an agent associated with the client device as a function of the contact plan, qualifications of the agent, and a current time. The server sends the highest opportunity contact to the client device. The client device receives and presents the contact from the list that was determined to be the highest priority, agent notes for that contact, and agent assistance text. The client device accepts input of results of the agent communicating with the contact and notes regarding the contact, and sends the result and the notes to the server.

24 Claims, 9 Drawing Sheets

CONTACT MANAGEMENT SYSTEM

CROSS REFERENCE TO RELATED APPLICATIONS

This application is a continuation of application Ser. No. 15/057,998, filed Mar. 1, 2016, now pending, and incorporated herein by reference in its entirety.

TECHNICAL FIELD

This application relates to the field of contact management software, in particular, for managing campaigns of calling current or prospective customers.

BACKGROUND

One widely used method of developing business, such as in the auto sales industry, is by calling current or prospective customers with the aim of enticing the customer to visit an auto dealership for a purpose. The purpose may be to sell the customer a vehicle or an accessory for the vehicle, or to perform maintenance on the customer's vehicle, such as a safety recall.

To that end, some auto dealerships employ call centers to contact such current or prospective customers, to make them aware of current promotions or incentives offered by the dealership, or to offer information about new vehicles for sale, for example. While the use of call centers has been proven to be effective, the efficiency of those call centers can be poor. For example, agents (those placing the calls) may spend a large amount of time between calls preparing for the calls, agents may not have the proper information available to them during a call to enable a favorable outcome, or the contacts called by the agent may be inappropriate.

To maximize the business development potential of call centers, it is important for each agent to spend as much time on the phone actually contacting, or attempting to contact, current or prospective customers. Thus, an effective contact management system should help reduce the time between calls, and should also help ensure that the contacts called are appropriate for a given calling campaign. Present contact management systems are not effective in accomplishing these aims, thus the development of new contact management system is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a system that includes a client device and a server. The server is configured to store, for a campaign, a list of contacts and a contact plan associated with that list of contacts. The server is also configured to store, for each contact, agent notes, and to store, for the campaign, agent assistance text. The server determines a highest priority opportunity from the list of contacts for an agent currently associated with the client device as a function of the contact plan, qualifications of the agent, and a current time of day. The contact from the list that was determined to be the highest priority opportunity is sent to the client device together with the agent notes for that contact and the agent assistance text.

The client device is configured to receive and present the contact from the list that was determined to be the highest priority, the agent notes for that contact, and the agent assistance text from the server. Input of a result of the agent attempting to communicate with the contact and of notes regarding the contact is accepted. The result and the notes regarding the contact are sent to the server.

The server is further configured to update the contact plan as a function of the result, and update the agent notes as a function of the notes regarding the contact.

DETAILED DESCRIPTION

Figure 1:
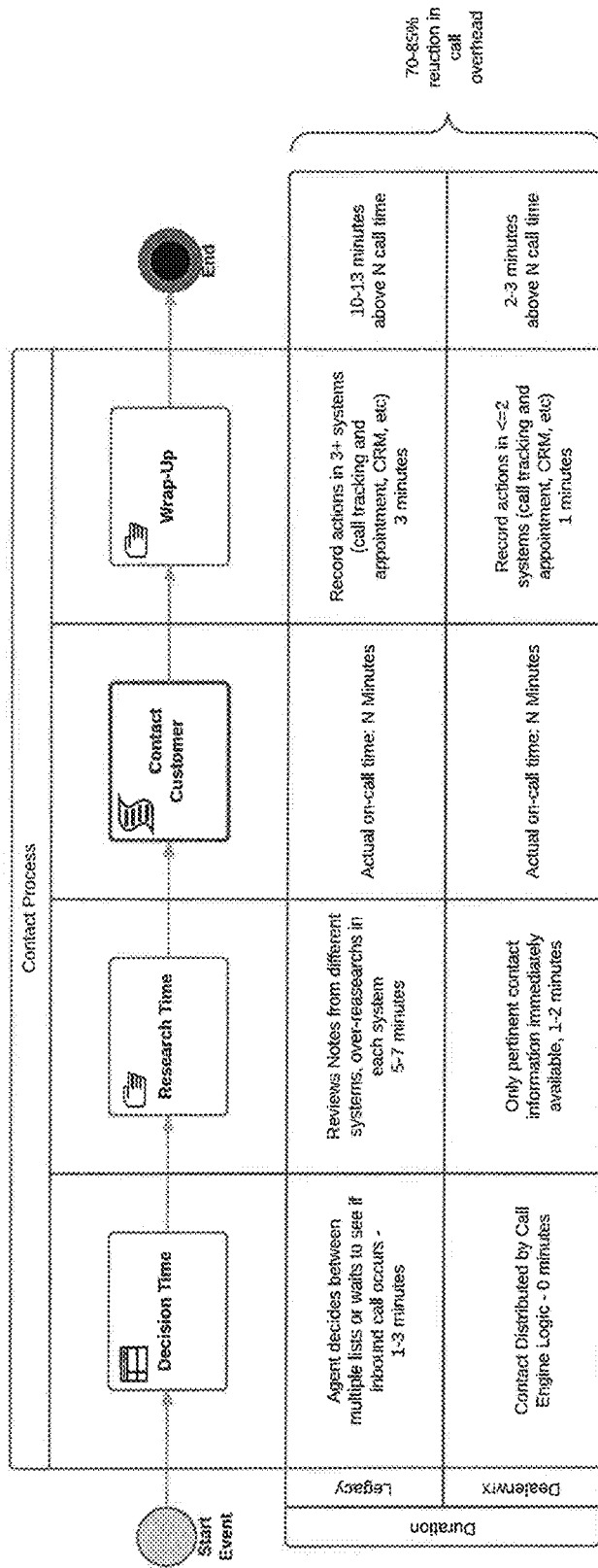
FIG. 1 is a chart comparing time spent in the process of establishing a communication with a prospective customer using prior art methods to time spent accomplishing the same using the techniques disclosed herein.

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

Disclosed herein is a contact management system that addresses the inherent obstacles and friction with successful business development efforts. The contact management system disclosed herein allows management to combine multiple segregated customer populations (lists) and campaign cadences (contact plans) into an opportunity-centric contact engine that schedules, distributes, and manages the contacts for optimal results.

Before contact is initiated, the contact management system selects the highest priority opportunity for the agent, based on agent qualifications and the agent's schedule, located the pertinent supporting documentation, and returns the relevant information to the agent together with the contact.

During the contact, the agent is continually supported by the contact management system. To that end, the contact management system presents management-approved scripts and messages to the agent. To help guide the agent toward a successful outcome, the contact management system also provides management-approved word tracks to the agent to help the agent address objections or questions raised by the contact.

At the conclusion of the contact, the contact management system categorizes the contact result for tracking, analytics, and re-engagement. Post contact, analytics can be reviewed and organized to highlight opportunities and create secondary campaigns to re-engage unsuccessful opportunities. This can be by data appends or changes to messaging or cadence.

Definitions of some terms used above, and some terms that will be used below, will now be given.

Agent: the individual communicating with contacts. This can be a team member who is dedicated to that responsibility or an individual who makes or accepts contacts as a portion of his or her duties.

Management: a single individual or multiple individuals who define parameters for campaigns and decide how agents are to conduct the campaigns.

Script: a word track, typically in a collection for the agent to refer while communicating with contacts. Scripts can have types for calls (reached), messages (not reached), prompted (objections), email templates, SMS text message templates, chat snippets, etc.

Customer: a prospective or existing customer, used as a contact.

Campaign: an effort combining a population of contacts segregated by a consistent quality and a business objective. In practice this is a contact plan (when to call/what to say) and a list of customers or prospective customers (who to call). A campaigns ends when the goal thereof is achieved. In some cases, this is when the customer appoints (sets an appointment), not when the customer "shows."

Cadence: individual schedule elements to the contact plan.

Opportunity: a single customer or contact in a campaign.

Communication: a single attempt to reach an opportunity. A communication can be either an inbound or an outbound activity using any channel of communication, including, but not limited to a phone contact (call), SMS text, email, or chat.

Call Outcome or Result: the categorization of each communication, specific to the campaign, customizable so as to allow valuable analysis and segregation for secondary campaigns.

Secondary Campaign: during the course of or after a campaign, unsuccessful contacts may be re-engaged by means of a secondary campaign. Based on responses and analysis of unsuccessful opportunities, management may convert some of the unsuccessful opportunities into a new campaign targeted to the situation of those opportunities. An example of this would be contacts that declined due to cost. Rather than beginning the campaign blanketing the entire population with a coupon, those contacts that did not appoint and indicated that cost was a factor, would be sent the coupon. This reduces the cost of the incentive, and also allows a stronger offer to be made to the contacts that did not initially appoint.

Call logic: what contact to make, when to make it, prescribing/requiring next cadence schedules.

DNCR (Do-Not-Call-Registry): an element of the Telemarketing Sales Rule, regulated by the Federal Trade Commission (FTC). FTC manages a database (DNCR) that permits individuals to register to limit the number and types of solicitation calls made to that individual. Some elements include the fact that an individual that lists their number on the DNCR must be excluded from outbound phone solicitation efforts unless there exists an existing business relationship (EBR). The standard for an EBR is either 1) a purchase within the last 18 months, or 2) an inquiry in the last 90 days. However, even if an EBR exists, if a customer has asked the organization to stop calls, that request supersedes the EBR and a call cannot be made. However, a product recall is not considered a solicitation under the regulations. To allow a organization to comply with these rules, the system described herein has functionality to allow the importing of the DNCR lists and prevents calling, except in those situations where it permitted by the campaign (automotive recalls) or an EBR exists.

The needs for the system to be described in detail below arise out of the fact that an increased call or communication volume correlates to a higher rate of success (such as a customer purchasing a product, or setting an appointment to come to a retailer location). The relatively low call or communication volume produced by prior art contact management methods results from delay on the part of human agents performing the communications with contacts or delay inherent to the contact management method. The inventors have found that delay inherent to the contact management method far outweighs and far exceeds delay caused by human agents. To best illustrate the advantages that are provided by the system to be described in detail below, shown in FIG. 1 is a chart comparing the decision time, research time, customer contact time, and wrap-up time spent using prior art contact management methods as opposed to the contact management techniques disclosed herein.

The decision time is the time spent by a human agent to decide amongst several lists and daily call sheets to determine which contact to attempt communication with next. The inventors have found that the decision time varies widely based on organization structure, number of active campaigns, average size of a campaign population and other variables, but typically takes an average of 2-3 minutes per contact.

The research time is the time spent by the agent reading previous contact notes, integrating information from disparate systems, reviewing scripts, and otherwise preparing for the next contact. The inventors have found that the research time can typically exceed 5-7 minutes.

Figure 2:
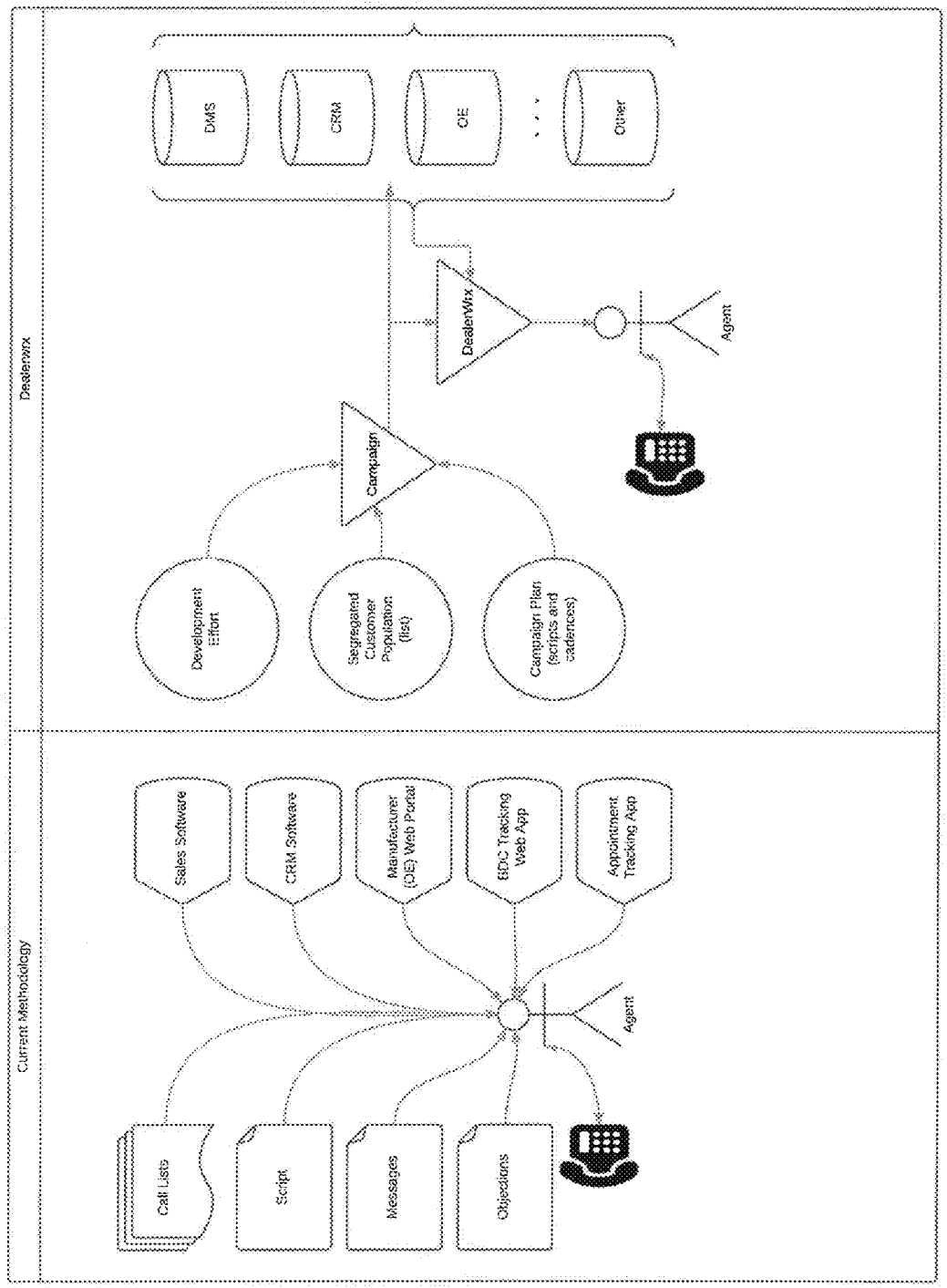
FIG. 2 is a chart showing information processed by a human agent in the process of establishing a communication with a prospective customer using prior art methods to information processed by a human agent in that process using the systems disclosed herein.

Between decision time and research time, 6-10 minutes can be made preparing for a call to a number that is disconnected. This results in a low call volume. Shown in FIG. 2 is a chart accompanying that of FIG. 1 that shows the differences in the information that is used by the agent during the decision time and research time when operating with prior art contact management systems as opposed to operating with the contact management systems taught herein.

Because the contact management systems disclosed herein distributes a next contact to an agent without decision being made on the part of the agent, the decision time is virtually eliminated, and is reduced to a second or two for the system to return the next opportunity. The contact management systems disclosed herein substantially reduce research time by correlating and integrating data from other sources in a consistent framework to provide consistency to the agent, and helps to focus the agent on the pertinent data relative to the contact. In addition, by integrating the tracking post call with the customer's response, the post-call follow-up is a substantially lighter weight function.

Figure 3:
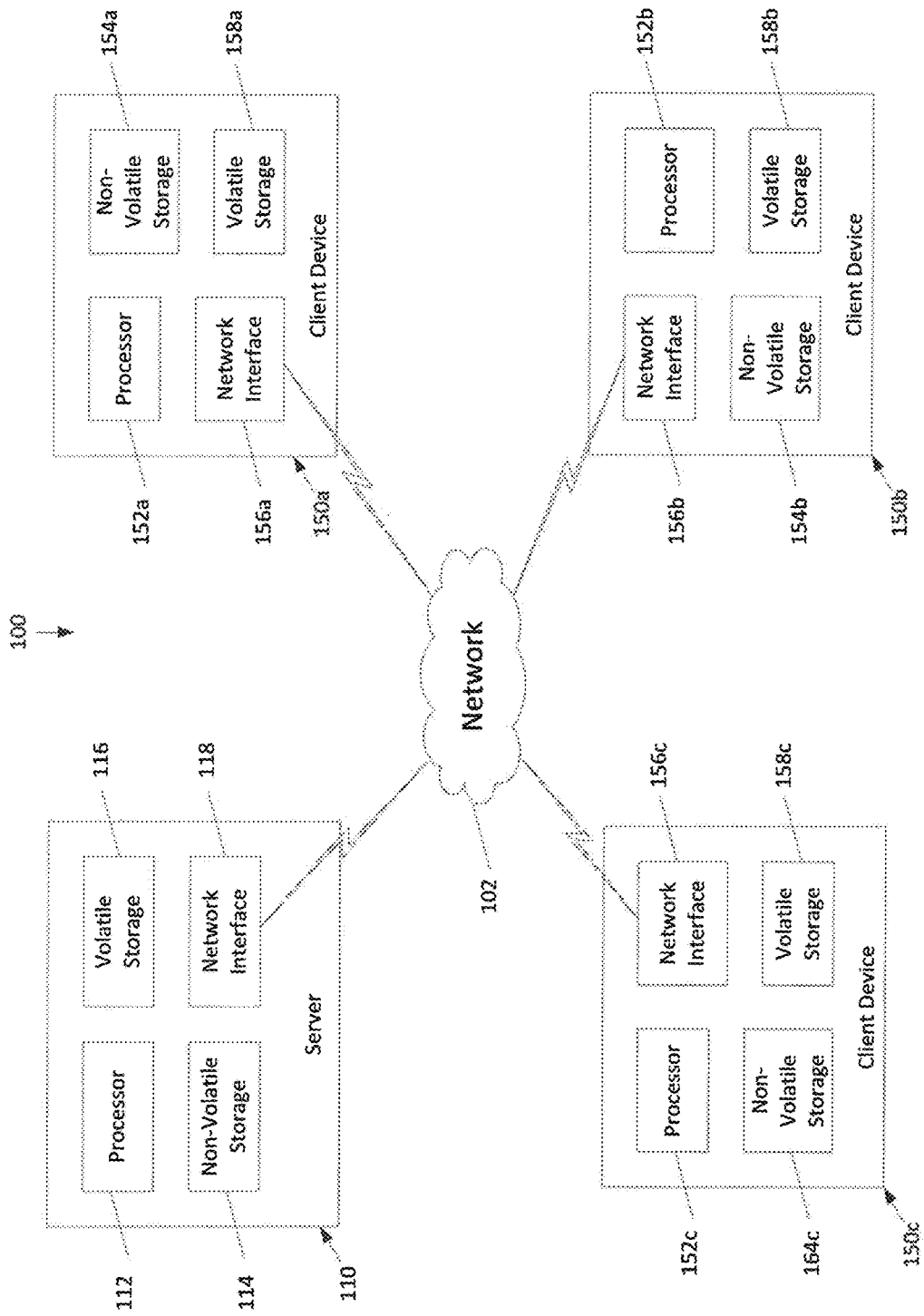
FIG. 3 is a schematic block diagram showing a server communicating with multiple client devices to perform the techniques disclosed herein.

With reference to FIG. 3, a system 100 for contact management is now described. The system 100 includes a network 102, such as a local or wide area network. A server 110 includes a processor 112 with non-volatile storage 114, volatile storage 116, and a network interface 118 coupled thereto. The non-volatile storage 114 of the server 110 stores server software and also functions as a central repository and database holding the information pertinent to the contacts, various campaigns, etc., as will be described below. The volatile storage 116 serves as random access memory used by the processor 112 in the course of executing the functions that will be described in detail below. The network interface 118 allows communication with the various client devices 150a-150c over the network 102.

Three client devices 150a-150c are shown, although it should be appreciated that there may be any number of such client devices. The client devices 150a-150c each respectively include a processor 152a-152c, non-volatile storage 154a-154c for storing client software, volatile storage 158a-158c serving as random access memory used in the course of executing the client functions that will be described below, and a network interface 156a-156d allowing communication with the server 110 over the network 102.

Figure 5:
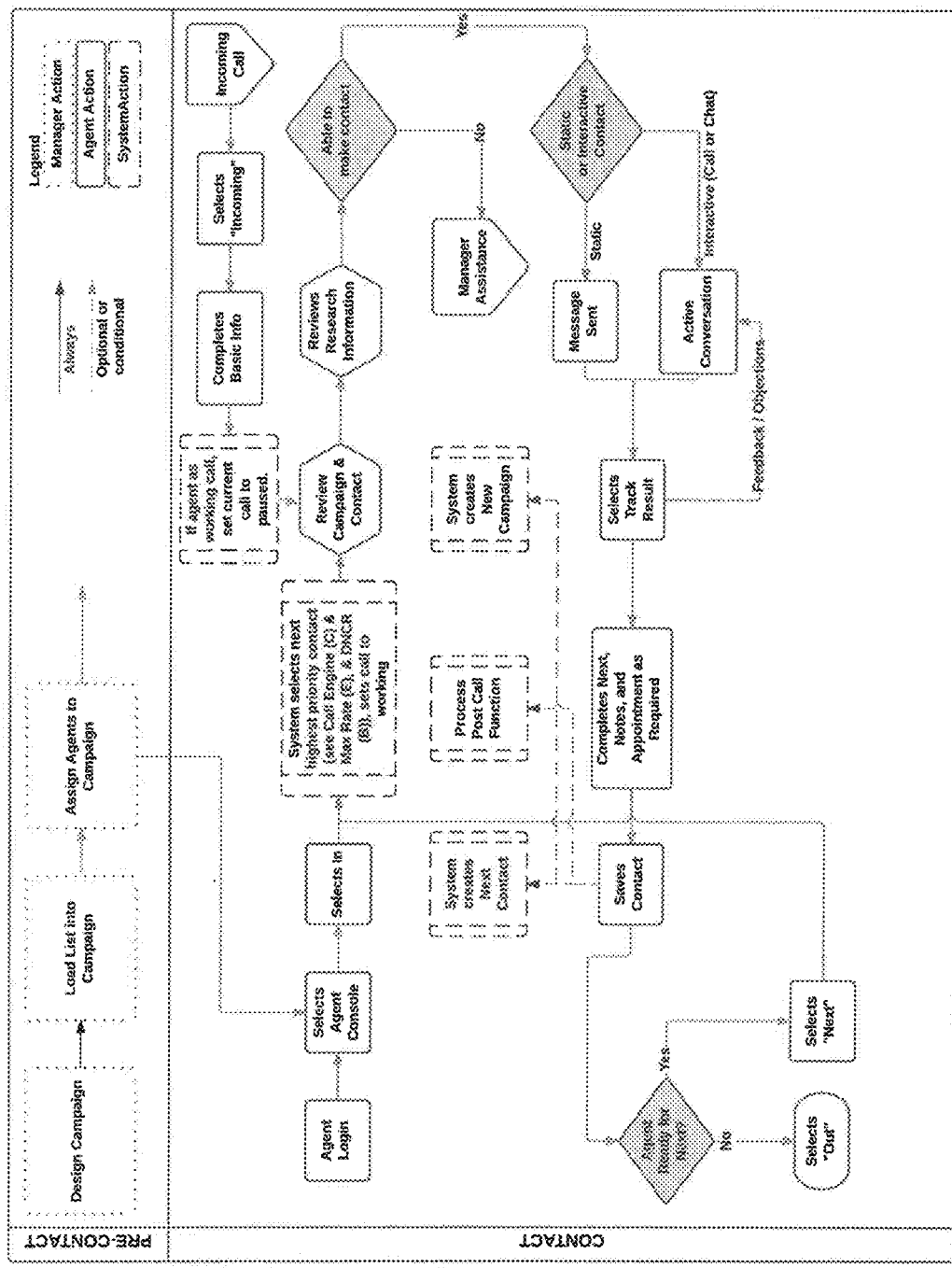
FIG. 5 is a flowchart showing performance of the techniques disclosed herein for contact management, such as may be performed using the system shown in FIG. 4.

With initial reference to FIG. 5, operation of the contact management system 100 will now be described. Before communications with contacts (current customers or prospective customers) are engaged, a campaign is first designed by a manager, a contact list for that campaign is loaded and associated with the campaign, and then agents are assigned to the campaign. These steps may be performed on the server 110 either directly, or indirectly through one of the client devices 150a-150c.

The contact plan may include, for each contact on the list, a minimum number of attempts to communicate with the contact before the campaign is considered to be failed with respect to that contact, a time window for each attempted communication (i.e. between 5 pm-8 pm), a contact cadence (i.e. a fixed cadence indicating certain dates a contact is to be initiated, or a relative cadence indicating a number of days or hours subsequent contacts are to be initiated after a first contact is initiated), a contact schedule (i.e. attempt communication with the contact once a week), a maximum contact frequency (i.e. do not attempt communication with the contact more than once every four days), and preexisting business relationship details (i.e. the fact that three year ago, the contact purchased a vehicle from the auto dealership the campaign is being conducted on behalf of).

Figure 4:
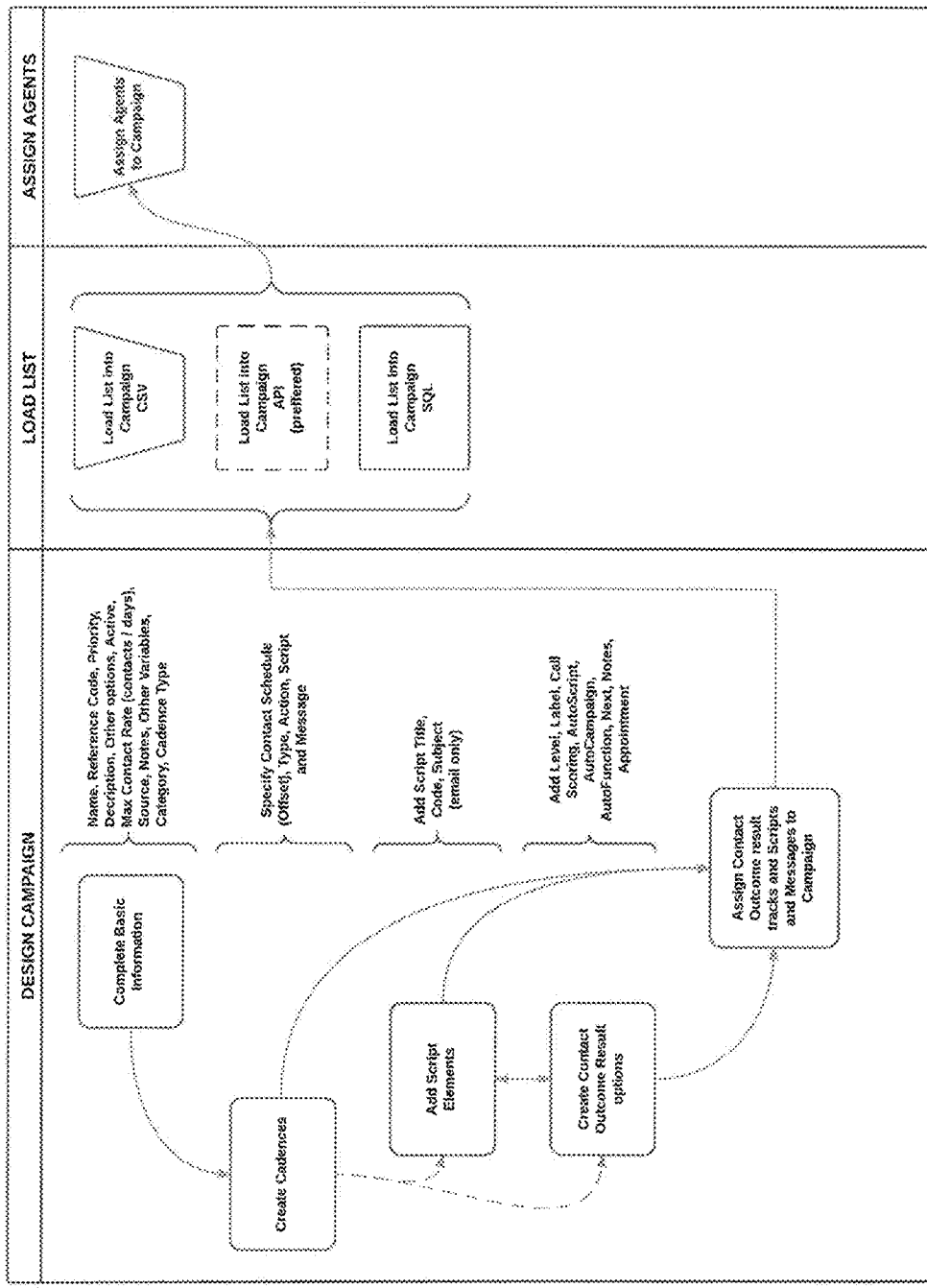
FIG. 4 is a chart showing campaign design, loading of contact lists, and assignation of agents to contacts, according to the techniques disclosed herein.

With additional reference to FIG. 4, campaign design is now described in more detail. Initially, basic information about the campaign is input, such as a name of the campaign, associated reference code and priority, description of the campaign, a max communication rate for contacts, a campaign source, campaign notes, a campaign category, a cadence type, and any other suitable information. Then, the cadences for the campaign are created, and these specify a communications schedule, type, actions to be taken, scripts, and messages to deliver. Next, script elements and contact outcome result options are entered, and the contact outcome results and scripts are assigned to the campaign. Thereafter, the contact list is loaded in a suitable format, such as CSV, SQL, or an API. Then, agents are assigned in the manager's console to the campaign.

After this initial setup is performed, engagement of communications with contacts may begin. Thus, a human agent operates one of the client devices 150a-150c, and logs into that client device. The agent then selects an agent console as opposed to a supervisor or management console (which will be discussed below), and operation begins. Once the agent is logged in and the agent console has been selected, the server 110 selects the highest priority opportunity or contact for that agent as a function of the contact plan, qualifications of the agent, and a current time of day. The server 110 then sends that contact to the client device 150a-150c operated by that agent together with stored agent notes (if any) for that contact, and agent assistance text, such as scripts for use in the campaign as well as answers to commonly asked questions or commonly stated concerns. The server 110 may also send information about a pre-existing business relationship with the customer (for example, that the customer has previously purchased a vehicle from the vehicle dealership on whose behalf the campaign is being conducted), information about previous communications or attempts at communication with the contact, or any other information known about the contact (for example, what make and model of vehicle the contact owns, or what language the contact speaks).

The agent then reviews the campaign, contact, and research information that has been collated and presented in a coherent and terse fashion, and attempts to engage the contact in communications. This attempted communication may be via a voice telephone call, text message (SMS), e-mail, online chat, or any other method. The client device 150a-150c itself may facilitate this communication, or additional devices either controlled or not controlled by the client device may be used in conjunction therewith, such as a telephone. If the attempted communication fails, then manager assistance can be requested, or a result of an inability to communicate with the contact can be reported back to the server 110. If the attempted communication is successful, it may be either a static or interactive communication. For example, the communication to a contact's phone number may be successful in that the contact's voice mail answers, making the communication a static one where the agent may leave a message for the contact.

On the other hand, if the contact were to answer the phone, accept a chat request, or respond to an SMS or e-mail, then an interactive communication would take place involving an active conversation between the agent and the contact. During the interactive communication, where the contact expresses objections or concerns, asks questions, or provides feedback, the agent can query the client device 150a-150c for assistance, or can record those objections, concerns, questions, or feedback using the client device 150a-150c. The agent assistance text may include canned responses to the questions, concerns, or objections, and may be displayed by the client device 150a-150c when queries, or as a matter of course.

At the conclusion of the communication, the agent may input the outcome of the communication (i.e. appointment set, a next communication set, failure to set an appointment or another call, request by the contact to be removed from the contact list, or that the contact is on the DNCR) to the client device 150a-150c, together with agent notes and contact updates, and the client device 150a-150c then sends the result and the notes to the server 110. The server 110 may then update the contact, the contact update, the contact plan, and the agent notes based upon the received result and notes. If the agent is then ready for the next call, they indicate as such to the client device 150a-150c, and if not, they also indicate as such to the client device 150a-150c.

Figure 6:
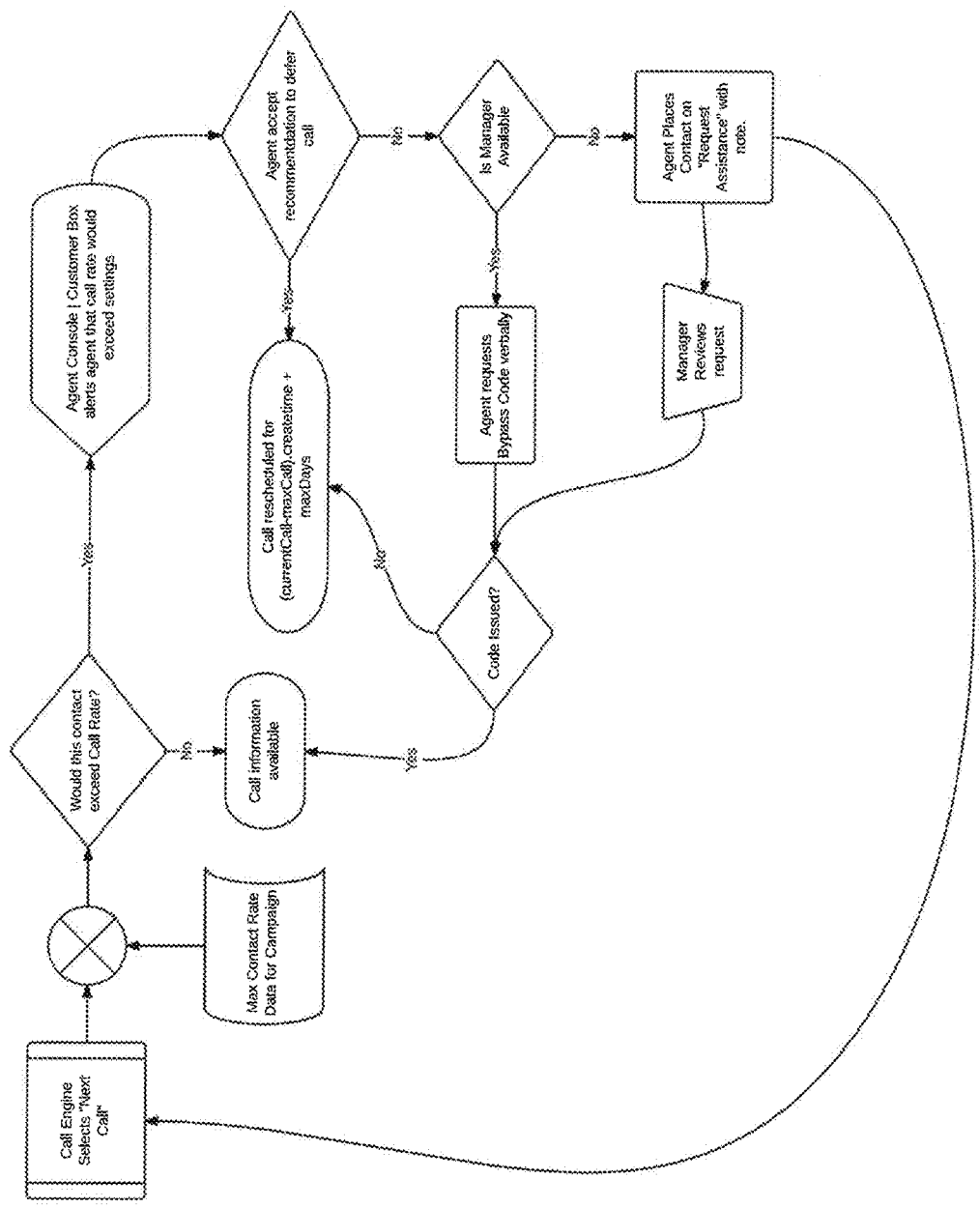
FIG. 6 is a flowchart showing contact selection and communication initiation, according to the techniques disclosed herein.

As illustrated in the flowchart of FIG. 6, the server 110 then selects a next contact to be called, and loads the max contact rate for the campaign. If a communication with this contact would exceed the max call rate, then the server 110 causes the client device 150a-150c to recommend to the agent to defer the call. If the agent accepts the deferral suggestion, then the call is rescheduled. If the agent wishes to not accept the deferral suggestion, and a manager is not available, the agent may note via the client device 150a-150c that assistance has been requested with that contact. If the agent wishes to not accept the deferral suggestion and a manager is available, the agent can request a bypass verbally. In either case, if the manager approves not following the deferral suggestion, a bypass code may be issued, and the communication may proceed. Likewise, if the communication with this contact would not exceed the max call rate, then the agent is free to proceed without warning by the client device 150a-150c.

Depending on any contact updates, agent notes, and the result, the server 110 may update the contact plan to indicate when the contact is next to be communicated with (for example, a next call date and time window), or may perform any other desired post call functions. The result or agent notes may indicate that the contact is not an appropriate contact for the current campaign (i.e. the campaign may be a recall campaign, and the contact may no longer own the vehicle that is the subject of that recall). In addition, the server 110 may over time build a new campaign based on the contact updates, agent notes, and results input by agents. For example, campaign under which the contact was communicated with may have been to set an appointment with the contact to go to an auto dealership and see a new model of vehicle. The agent notes may indicate that the contact has already purchased the new model of vehicle, or is not looking to purchase a new vehicle, and the new campaign may then be to sell accessories to the contact for their existing vehicle. Other new campaigns may be, for example, an appointment reminder campaign, a missed appointment campaign, a vehicle recall campaign, a vehicle service campaign, or any other suitable campaign. The agent notes may also indicate that the agent that attempted the communication is not qualified for communication with that contact, such as may happen when the agent does not speak the language spoken by the contact.

Because the purpose of the communication with the contact is known when the analytics and metrics results are created, the system 100 can dramatically reduce the involved with tracking the analytics and metrics, as well as increase the accuracy thereof. Contacts are automatically scored consistent with their respective results. Typical tracking data such as contact rates, non-appointment contacts, and attempted contacts are inherently tabulated. Also in this area the next, notes, and appointment fields configure the post call options available to the agent, increasing accuracy. Furthermore, these settings define subsequent actions for the opportunity.

Examples of the results include, but are not limited to: (1) an attempt, where communication was attempted but not made; (2) a communication where the contact was successfully reached; (3) a non-appointment, where the contact was reached, but circumstances exist that render the goal of the campaign unobtainable, (4) an appointment, where contact was reached and the campaign was successful in its goal, which may be setting an appointment of some sort with the contact.

By monitoring these metrics and analytics, a manager is able to answer a variety of questions to determine the effectiveness of the campaign. Such questions include:

(1) Was the contact list meaningful? Were the correct contacts selected to call? For example, calling customers who just purchased a vehicle to invite them to see the new model, would not be selection of the correct contacts.

(2) Was the contact data (phone numbers, email addresses, etc) valid to get the desired result? For example, there could be out of date data that had excessive disconnected numbers.

(3) Were the contacts communicated with a sufficient number of times to increase the chances of success? For example, under a campaign to cultivate leads for a large purchase, a contact was communicated with once, where multiple contacts are desirable to generate awareness, create urgency, and urge reciprocity.

(4) Where the communications with the contact made on the right schedule for success? Was the cadence scheduled in a way that is appropriate with the urgency of the offer and situation? For example, a dentist office calling a customer three times a day to schedule a cleaning six months from now would not be appropriate. Conversely, a contact that has parts on order that is only contacted once when the part arrived, and again before the part is returned due to not being picked up by the contact, is insufficient.

(5) Were multiple attempts made to reached contacts at different times of the day to find more convenient time to reach the customer? For example, were contacts communicated with during the morning hours when they would have preferred communications at night?

(6) What happened with the contacts where the campaign was not successful? Was it a segregation mistake, data shortcoming, messaging mistake, or scheduling error that caused the poor results?

(7) Was the totality of the management's intentions carried out by the agents? For example, is a given agent not communicating with all contacts on the list, or only calling contacts once?

A manager may access the server 110 to define and view analytics collected on each agent, and/or may make a variety of changes to the system 100. For example, the manager may set, for some or all contacts, that an attempted communication with that contact or contacts may not be skipped by an agent, if the system 110 is configured to allow the agent to skip past contacts.

As explained, for each contact, different types of information may be stored. The manager may, via the server 100, define a subset of the different types of information about the contact to be displayed to the agent. Thus, the manager may preclude information considered to be extraneous, or not helpful to the present campaign, from being presented to the agent, helping to streamline the information viewed and assimilated by the agent.

The server 110 may be configured to collect and store a performance metric for each agent, and may update that performance metric as a function of the result. The performance metric may be, for example, a ratio of successful contact communications to appointments set, and/or a ratio of successful appointment shows to appointments set. A manager can view these metric when evaluating an agent's performance. Other sample metrics that may be collected may be the time the agent spends between calls, for example.

Metrics on the results, and on the questions, concerns, and objections raised by contacts may also be collected. Thus, for example, it may be determined that a certain type of contact (defined by information known about that contact) tends to not respond positively to a first type of offer or to a first response addressing a given question, concern, or objection, but tends to respond positively to a second type of offer or to a second response addressing the given question, concern or objection. This information may be used when building a secondary campaign, as should be appreciated.

The secondary campaign may be, for example, to send a SMS message or messages to a contact who was called but who did not pick up, or whose voicemail picked up.

Also, although the agent has been described above as being a human agent, in some applications the agent may be a machine performing the communications, such as a robotic call or a chat "bot".

As should be understood, there are times that the communication cannot or should not be completed. In those cases, to permit an agent to move to the next call a contact may be marked as needing "Manager Assistance". Some acceptable uses could include: (1) non-English opportunity with an agent that only speaks English, (2) a company opportunity when department is not engaging company prospects, or (3) to await a DNCR resolution from management.

Figure 7:
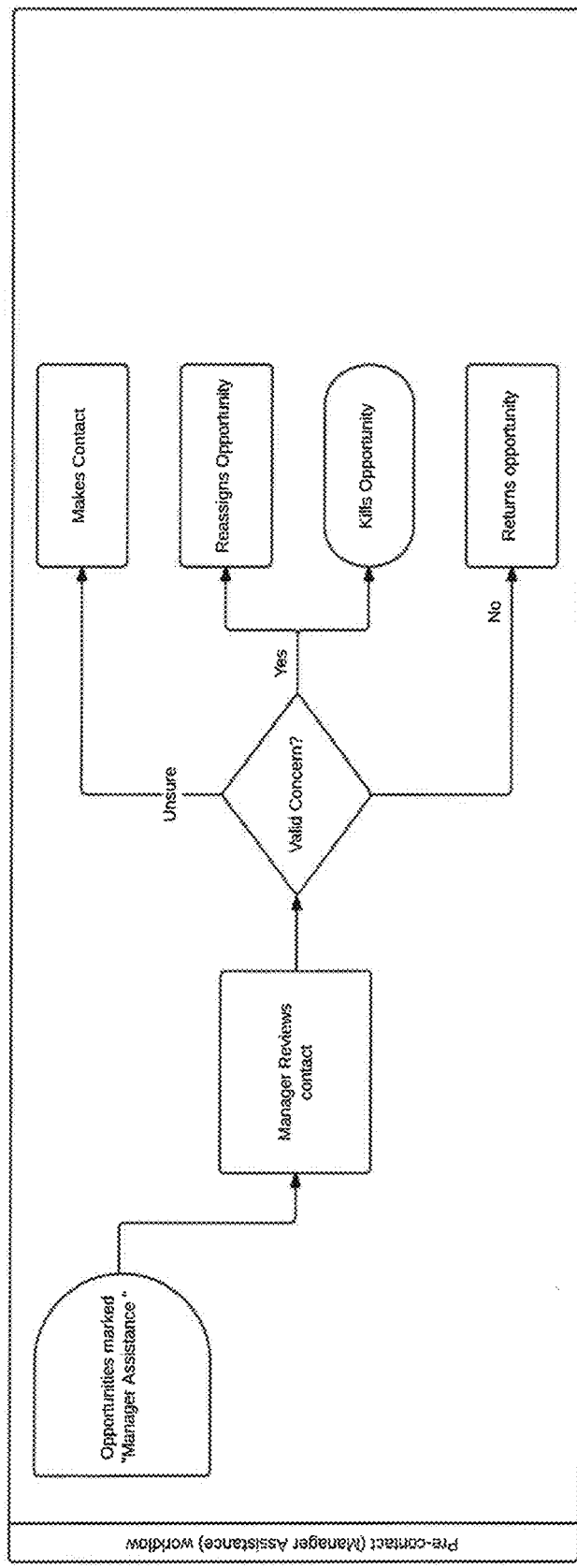
FIG. 7 is a flowchart showing a manager assistance and review workflow, according to the techniques disclosed herein.
Figure 8:
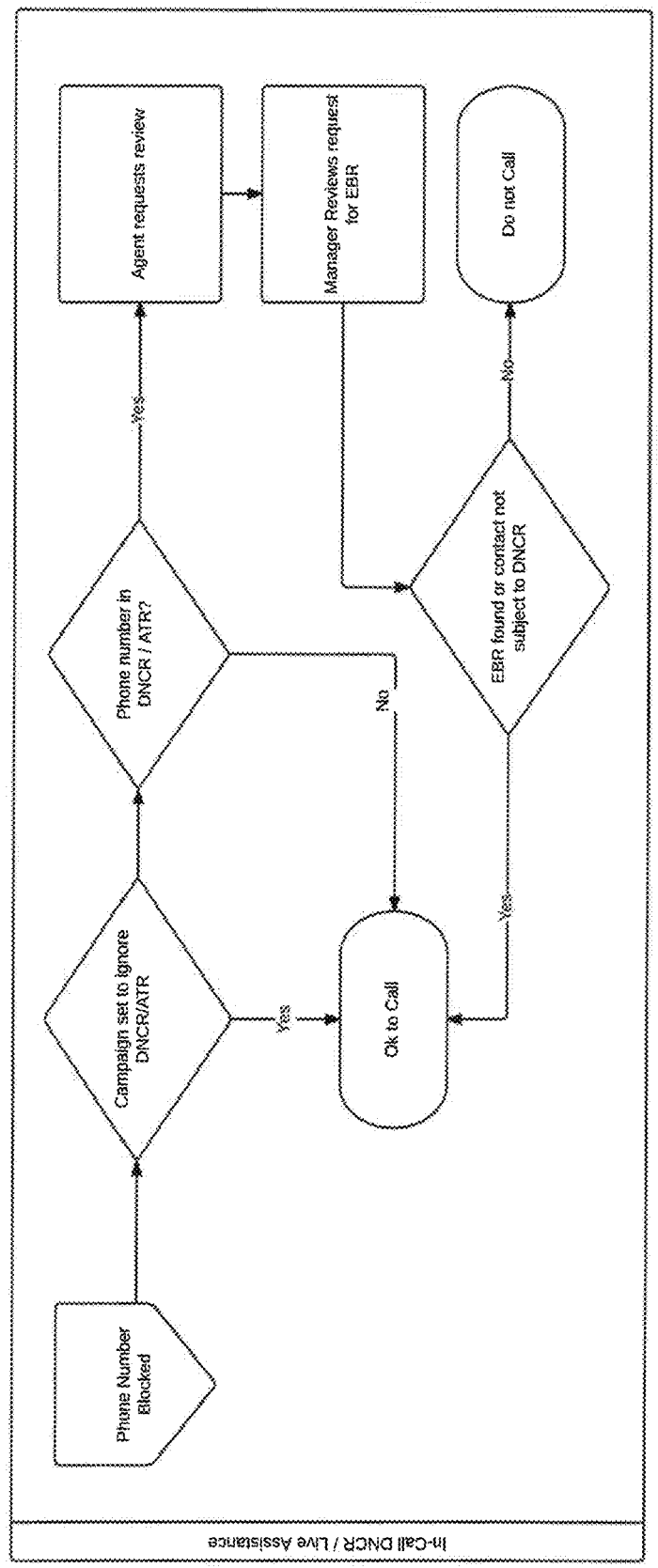
FIG. 8 is a flowchart showing handling of a situation where a contact is on the do not call registry, according to the techniques disclosed herein.

A flowchart of managerial review of these marked contacts is now described with reference to FIG. 7. Here, the manager reviews each contact that is so marked, and determines whether or not the concern raised by the agent was valid. If the concern is not valid, the manager provides input of such to the server 110, and the server then returns that contact to the normal workflow. If the manager is unsure whether the concern was valid, the manager may then, via their client device 150a-150c, attempt communication with the contact. If the manager finds the concern to be valid, then the manager may either remove the contact or opportunity from the campaign, or may reassign the contact or opportunity to another agent (i.e. may reassign the contact of a prospective customer who speaks Spanish to a Spanish speaking agent).

Where the concern raised is that the contact is listed as being blocked, as shown in FIG. 8, the server 110 may ignore the DNCR if the campaign is not subject thereto (for example, a vehicle recall campaign), and instruct the agent, via the client device 150a-150c, to proceed with the call. If the campaign is subject to the DNCR, the server 110 may check whether the number is included in the DNCR, and if not, instruct the agent, via the client device 150a-150c, to proceed with the call. If the number is included in the DNCR, then the agent may request review and place a management review request. If the manager finds an existing business relationship, then the manager can instruct the server 110 to instruct the agent, via the client device 150a-150c, to proceed with the call. If the manager finds that there is no existing business relationship, then the manager can instruct the server 110 to instruct the agent, via the client device 150a-150c, to not proceed with the call and move on to the next contact.

Figure 9:
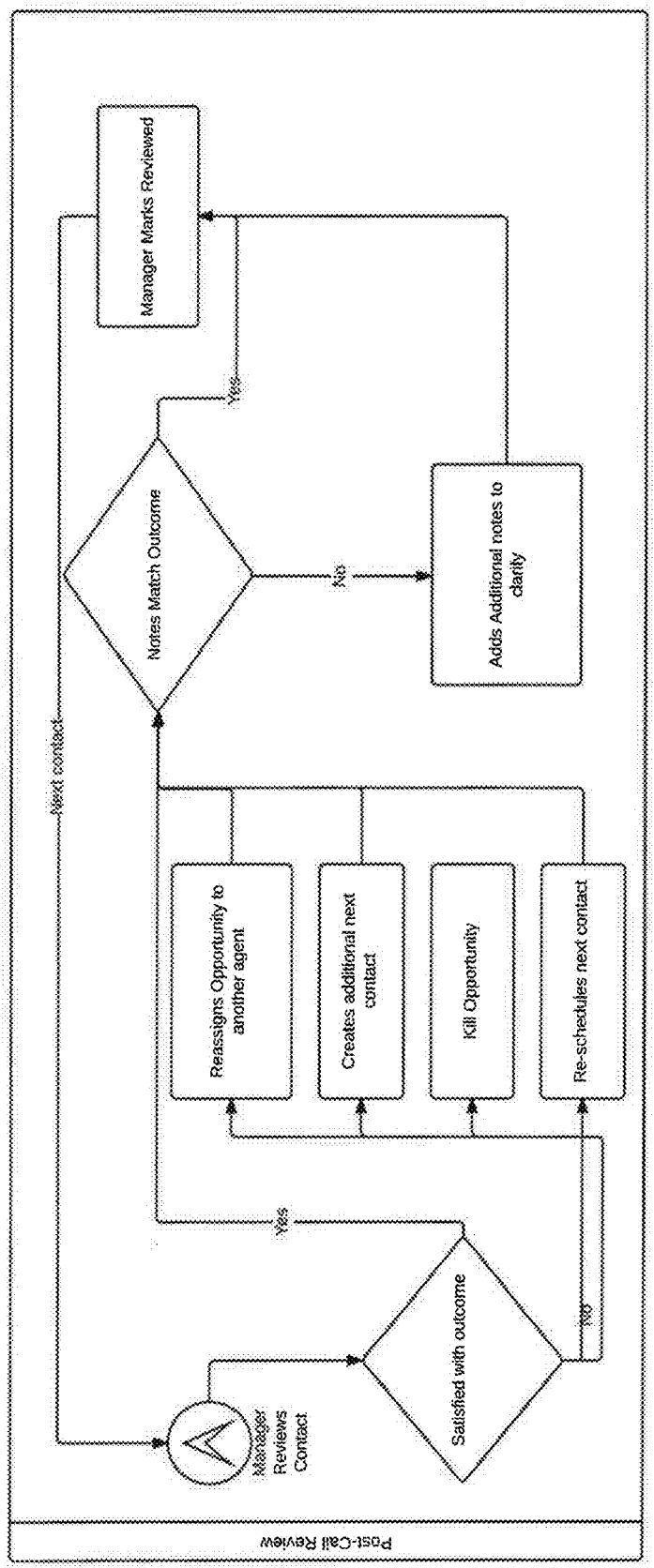
FIG. 9 is a flowchart showing manager post call review workflow, according to the techniques disclosed herein.

Review of agent performance and campaign effectiveness via metrics has been discussed above. A workflow for managerial review of campaign effectiveness is now described with reference to FIG. 9. Here, the manager reviews the contacts on the server 110 together with all associated information and metrics. If the manager is satisfied, and the agent notes match with the result of the communication, the manager may mark the contact as reviewed. If the manager is satisfied and the agent notes do not match with the result of the communication, the manager may add clarifying notes. If the manager is not satisfied with the outcome, the manager may take a variety of actions, such as rescheduling a next communication with the contact, terminating the contact or opportunity, creating an additional contact, or reassigning the contact or opportunity to another agent.

It should be understood that all actions above described as have been taken by the agents, or by the manager, may be accomplished via direct communication with the server 110, or via use of the client devices 150a-150c to communicate with the server 110.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A system comprising:
a client device;
a server configured to:
store, for a campaign, a list of contacts and a contact plan associated with that list of contacts;
store, for each contact, agent notes;
store, for the campaign, agent assistance text;
determine a highest priority opportunity from the list of contacts for an agent currently associated with the client device as a function of the contact plan, qualifications of the agent, and a current time;
send the contact from the list that was determined to be the highest priority opportunity to the client device together with the agent notes for that contact and the agent assistance text;
wherein the client device is configured to:
receive and present the contact from the list that was determined to be the highest priority, the agent notes for that contact, and the agent assistance text from the server;
accept input of a result of the agent attempting to communicate with the contact and of notes regarding the contact.

2. The system of claim 1, wherein the server is further configured to store, for each campaign, a permissible set of call results; and wherein the result of the agent attempting to communicate with the contact accepted as input is one of the permissible set of call results.

3. The system of claim 1, wherein the server is configured to store, for each contact, information about previous communications; and wherein the server is configured to update the information about previous communications after an attempted communication with the contact.

4. The system of claim 1, wherein the agent assistance text comprises a script.

5. The system of claim 1, wherein the contact plan comprises, for each contact of the list thereof, at least one of a minimum number of successful attempts to communicate with the contact, a time window for each attempted communication, and a contact schedule.

6. The system of claim 5, wherein the contact plan further comprises, for each contact of the list thereof, a maximum contact frequency.

7. The system of claim 6, wherein the contact plan further comprises, for each contact of the list thereof, preexisting business relationship details.

8. The system of claim 1, wherein the server is configured to store an agent performance metric for the agent and update the agent performance metric as a function of the result.

9. The system of claim 8, wherein the agent performance metric comprises at least one of a ratio of successful contact communications to appointments set and a ratio of successful appointment shows to appointments set.

10. The system of claim 1, wherein the result comprises whether the contact was successfully communicated with and whether the contact set an appointment.

11. The system of claim 10, wherein the server is further configured to add the contact to an appointment reminder campaign as a function of the result being that the contact was successfully communicated with and that the contact set an appointment.

12. The system of claim 1, wherein the campaign comprises a vehicle sales campaign, a vehicle recall campaign, a vehicle service campaign, a missed appointment campaign, or an appointment reminder campaign.

13. The system of claim 1, wherein the campaign comprises a revenue generating purpose or a customer satisfaction improvement purpose.

14. The system of claim 1, wherein the server is configured to define a secondary campaign as a function of, for at least some contacts, the result of the agent attempting to communicate with the contact and the notes regarding the contact.

15. The system of claim 1, wherein the server is configured to mark the contact as an improper target for the campaign as a function of the agent notes.

16. The system of claim 1, the agent notes include a language spoken by the contact; and wherein the qualifications of the agent include whether the agent speaks the language spoken by the contact.

17. The system of claim 1, wherein the agent assistant text comprises a script for use by the agent in communications with the contact.

18. The system of claim 1, wherein the agent assistant text comprises an answer to a concern expressed by the contact.

19. The system of claim 1, wherein the server is further configured to update a portion of the contact plan associated with the contact in response to input received from the agent via the client device.

20. The system of claim 1, wherein the contact plan for at least some of the contacts indicates that attempted communications with those contacts may not be skipped by the agent.

21. The system of claim 1, wherein the server is further configured to:
store, for each contact of the list thereof, different types of information about that contact; and
send an administrator definable subset of the different types of the information about the contact to the client device for display to the agent.

22. The system of claim 1, wherein the client device is configured to attempt to communicate with the contact via one of a voice communication, an e-mail communication, a short message service communication, and a chat communication in response to receipt of the contact from the server.

23. The system of claim 1, wherein the client device is further configured to:
send the result and the notes regarding the contact to the server.

24. The system of claim 1, wherein the server is further configured to:
update the contact plan as a function of the result; and
update the agent notes as a function of the notes regarding the contact.

\* \* \* \* \*